United States Patent [19]

Akamatsu

[11] 4,161,680

[45] Jul. 17, 1979

[54] AC ROTARY MACHINE APPARATUS

[75] Inventor: Masahiko Akamatsu, Amagasaki, Japan

[73] Assignee: Mitsubishi Denki Kabushiki Kaisha, Tokyo, Japan

[21] Appl. No.: 847,436

[22] Filed: Nov. 1, 1977

[30] Foreign Application Priority Data

Nov. 2, 1976 [JP] Japan .................................. 51-131906

[51] Int. Cl.² .............................................. H02P 5/40
[52] U.S. Cl. ...................................... 318/722; 318/766; 318/801; 363/43; 363/137
[58] Field of Search .............. 318/138, 171, 188, 197, 318/215, 225, 696, 766, 800, 801, 721-723; 310/49; 363/43, 137

[56] References Cited

U.S. PATENT DOCUMENTS

| | | | |
|---|---|---|---|
| 3,614,580 | 10/1971 | Eto ......................................... | 318/696 |
| 3,749,991 | 7/1973 | Kuniyoshi .............................. | 318/171 |
| 3,842,332 | 10/1974 | Heine et al. ........................... | 318/696 |
| 3,866,104 | 2/1975 | Heine ..................................... | 318/138 |

*Primary Examiner*—Gene Z. Rubinson
*Attorney, Agent, or Firm*—Oblon, Fisher, Spivak, McClelland & Maier

[57] ABSTRACT

An AC rotary machine apparatus comprises an AC rotary machine having AC windings forming five or seven phases and an AC feeder having solid state switches feeding AC power to the AC windings in five or seven phases.

20 Claims, 12 Drawing Figures

AC ROTARY MACHINE APPARATUS

BACKGROUND OF THE INVENTION

1. Field of the Invention:

The present invention relates to an electric machine apparatus such as a solid state commutator motor wherein the current is fed to AC windings by an inverter or a power converter using solid state switches.

2. Description of Prior Art:

The combinations of the solid state AC feeder with various AC motors such as a non-commutator motor, a thyristor motor and an inverter type induction motor have been known. These motors are solid state commutating motors using solid state switches as a commutator.

The combinations of the current type converter with the synchronous motor or the induction motor have been well-known as a non-commutator motor and a current type variable frequency inverter because the motor driving and the regenerative braking operation can be economically attained.

Figure 1A:
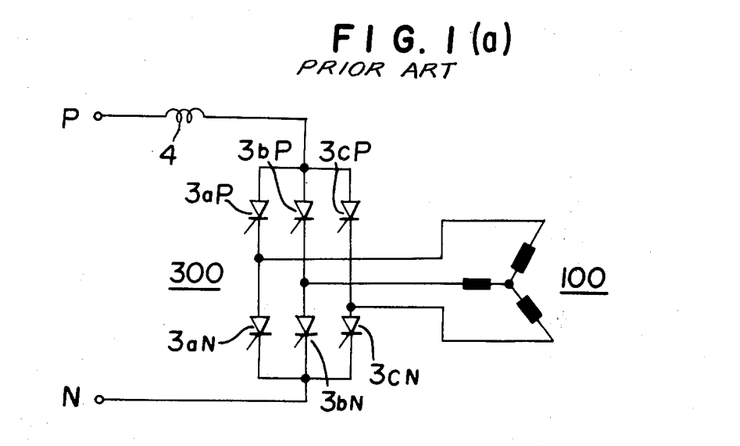
FIGS. 1(a), (b) are respectively connection diagrams of the conventional solid commutator motor.
Figure 1B:
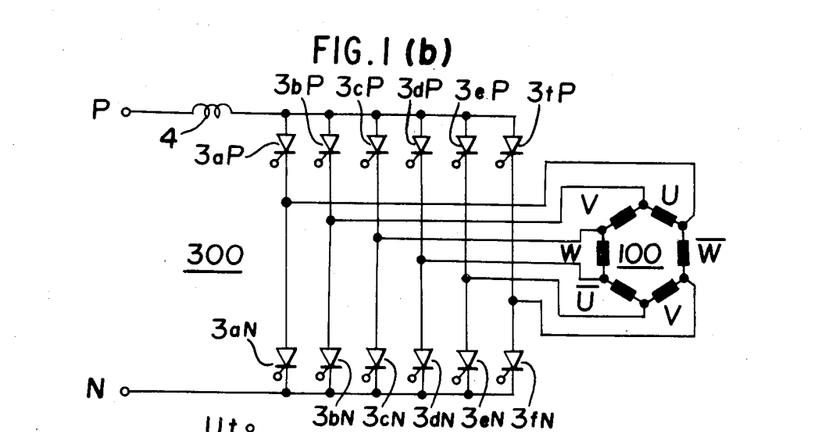

FIGS. 1(a), (b) are connection diagrams of the conventional inverter type solid state commutator motors. In FIG. 1, the references p and N designate DC input terminals; (4) designates a smoothing reactor; (300) designates a solid state commutator connected in bridges (inverter); (100) designates AC windings of the AC motor.

The AC windings of the conventional AC motor are connected in three or six phases, whereby the solid commutator (300) comprises solid switches connected in three phase bridges or six phase bridges.

The combination of the three phase AC windings and the three phase bridges shown in FIG. 1(a) has been widely used. However, the AC windings of the three phase AC motor have the inner connection shown in FIG. 1(c) wherein pairs of windings in the relation of reverse phase (U, $\overline{U}$) (V, $\overline{V}$) (W, $\overline{W}$) are respectively connected in series, whereby it has the six phase structure in inner structure though it seems to be three phase structure.

Figures 1C, 1D:
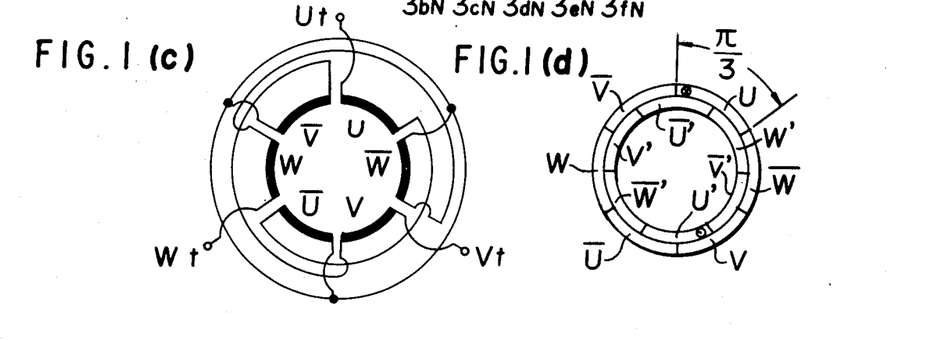

The sectional space distributing region of the winding conductors can be shown in FIG. 1(d), wherein the conductor distributing region for one phase (phase belt) is the electric angle of $\pi/3$ and the six groups of coils U, V, W, $\overline{U}$, $\overline{V}$, $\overline{W}$, are disposed. The return conductor distributing regions of the groups of coils are shown as U', V', W', $\overline{U}'$, $\overline{V}'$, $\overline{W}'$. The coils pitches of the coils are usually short pitches. In the short pitches, the return conductors are disposed in the positions shifting for the electric angle $\pi$.

As it is clearly understood, the three phase connection in FIG. 1(a) has the six phase winding structure in fact, whereby the winding operation required for the six phase connection of FIG. 1(b) is needed.

On the solid state commutator, in the embodiment of FIG. 1(a), commutation is performed 6 times in one cycle. In FIG. 1(b), one of the positive solid state switches (3aP) to (3fP) and one of the negative solid state switches (3aN) to (3fN) are turned on and off in one phase. For example, the switches (3aP) and (3dN) are simultaneously controlled to turn on and off.

On the AC windings, the windings U and $\overline{U}$, V and $\overline{V}$ or W and $\overline{W}$ are simultaneously commutated. Accordingly, in the six phase connection of FIG. 1(b), the commutations are performed 6 times in one cycle.

The characteristics and the winding structure of the motor are the same for both of the connections of FIGS. 1(a) and (b). The connection of FIG. 1(b) has no merit on the two times of the phases.

In the solid state commutator motor, the torque pulsations are caused 6 times in one cycle and the torque pulsation is disadvantageously large. When it is commutated by the inner electromotive force of the AC windings of the motor, or the cage type induction motor is driven, the AC winding power-factor is inferior and the torque pulsation is remarkably large, disadvantageously.

SUMMARY OF THE INVENTION

It is an object of the present invention to provide an AC rotary machine apparatus having AC feeder using solid state switches.

It is another object of the present invention to provide an AC rotary machine apparatus for reducing the torque pulsation which is disadvantageous in the applications for a mill motor and an elevator.

In accordance with one embodiment of the present invention, the motor has AC windings for five or seven phases and number of times of commutations m are 10 or 14 in one cycle. When the commutation superposing angle U is near the critical superposing angle as $U \fallingdotseq 2\pi/m$, the torque pulsation is in inverse proportion to $m^2$ whereby the torque pulsation for the five or seven phase structure can be substantially the same as that of the DC motor. The operation near the critical superposing angle can be attained by providing five or seven phases and compensation windings.

BRIEF DESCRIPTION OF THE DRAWINGS

FIGS. 1(c) and (d) respectively show distributions of the windings;

FIGS. 8(a), (b) show embodiments on the winding method to form AC windings of the motor.

DETAILED DESCRIPTION OF THE PREFERRED EMBODIMENTS

The object of the present embodiment is to reduce a torque pulsation of the solid state commutator motor.

The present invention is to provide a structure suitable for a driving device by a solid state switch type power feeder of a synchronous motor or an induction motor.

The object of the present embodiment is to reduce the torque pulsation of an inverter driving cage type induction motor or an AC motor driven by an inner electromotive force commutating thyristor inverter which is commutated by the inner electromotive force of AC windings.

Figure 2:
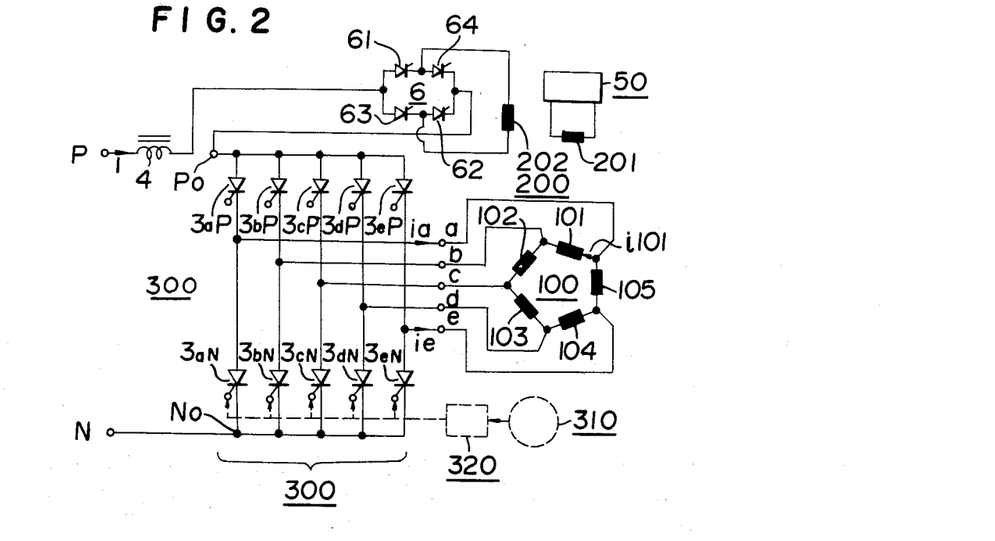
FIG. 2 is a connection diagram of one embodiment of a motor according to the present invention.

FIG. 2 is a connection diagram of one embodiment of a five phase solid commutator motor according to the present invention.

In FIG. 2, the reference numeral (100) designates armature windings having the first phase AC windings (101) to the fifth phase AC windings (105) which are in a loop connection; (200) designates field magnet having direct axis field windings (201) and quadrature axis field windings (202) (compensating windings). It is advantageous to wind the armature windings (100) on a stator and to wind the field windings on a rotor so as to reduce slipping or to be brushless. The reference numeral (50) designates a direct axis exciting power source and (6) designates a switching device for passing DC input current to the quadrature axis field windings (202) in reversible polarity and the switching device is connected in series to the DC input circuit and when solid switches (61), (62) are turned on, the switching device attains positive series compensation and when solid state switches (63), (64) are turned on, the switching device attains negative series compensation.

The reference numeral (300) designates a solid commutator which comprises positive solid state switches (3aP) to (3eP) connected between AC terminals a to e and a positive DC terminal Po and negative solid switches (3aN) to (3eN) connected between AC terminals a to e and a negative DC terminal No wherein the contacts of the phase windings in loop connection are the AC terminals. For example, the solid state switches (3aP) to (3eN) are thyristors or transistors to attain an inverter function. The reference numeral (4) designates a filter reactor; (310) designates a position detecting device for detecting electromagnetic relative positions between the armature (100) and the magnetic field (200); (320) designates a turn-on controlling device for controlling turn-on of the solid state switches depending upon the detected positions.

Figure 3:
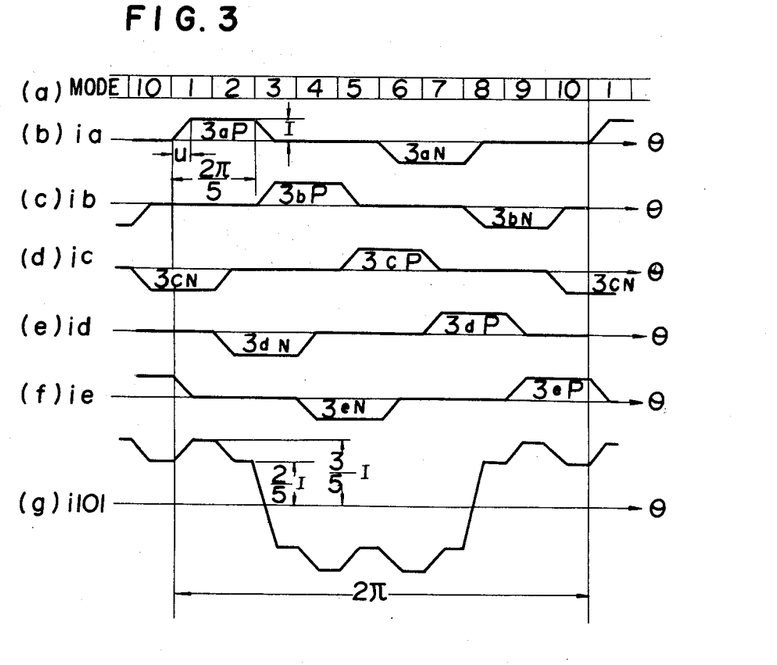
FIG. 3 shows waveforms in the operation of the motor.

FIG. 3 shows waveform diagrams of the five phase solid state commutator circuit shown in FIG. 2. In FIG. 3, (a) designates mode numbers and one cycle of alternating current $2\pi$ is divided into 10 parts and the AC line currents ia to ie are shown in FIG. 3(b) to (f) and AC peak values are respectively equal to DC input current I.

In the waveforms of the line currents ia to ie, the references (3aP) to (3aN) described for each of positive and negative half waves mean the currents passed through the corresponding solid switches (3aP) to (3eN). The slope parts at the rising or the falling time of the trapezoid waveform are the superposing time U. One solid state switch is in the ON state during the time of the electric angle $((2\pi/5)+U)$. The positive solid state switches (3aP) to (3eP) are turned on at the initiation of the odd number mode and the negative solid state switches (3aN) to (3eN) are turned on at the initiation of the even number mode. After the finish of superposition of the mode 1, the solid state switches (3aP) and (3cN) are turned on and the DC current I is passed from the AC terminal a to the AC terminal c. As the result, 3/5I is passed in shunt to the first phase AC windings (101) and the second phase AC windings (102) and 2/5I is passed in shunt to the other third to fifth phase AC windings (103) to 105). The shunt ratio is decided by the inverse proportion of numbers of windings in the shunt circuits, that is, impedances.

In the second mode, the switches (3aP) and (3dN) are turned on to pass the DC current from the terminal a to the terminal d. The first phase AC winding current i101 is 2/5I.

In the third mode, the switches (3bP) and (3dN) are turned on to pass the DC current from the terminal b to the terminal d. The first phase AC winding current i101 is $(-2/5I)$.

Figure 7:
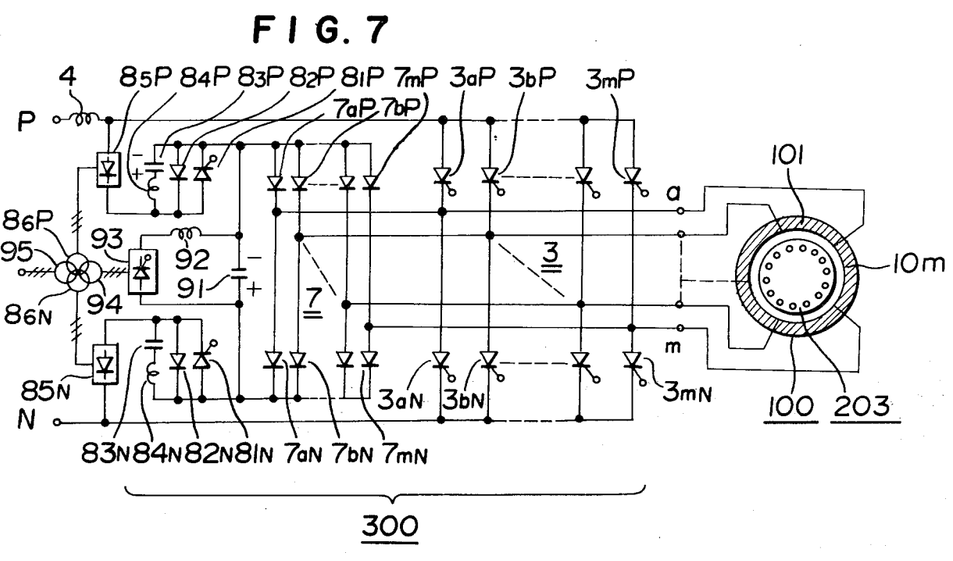
FIG. 7 is a connection diagram of one embodiment of a cage type induction motor.

In the fourth mode, the switches (3bP) and (3eN) are turned on. The first phase AC winding current i101 is $(-3/5I)$. Thus, the waveform of the first phase AC winding current i101 is substantially a rectangular waveform having four values of $\pm 2/5I$ and $\pm 3/5I$ as shown in FIG. 7(g).

The currents in the other phases have similar waveforms having phases shifting for each $2\pi/5$ in sequence.

The commutation is performed at the beginnings of the modes so as to commutate 10 times in one cycle.

In order to attain the above-mentioned operation, the solid state switches (300) are turned on under synchronizing to the AC winding inner electromotive forces, and accordingly, the position detecting device (310) and the turn-on controlling device (320) are used.

The relation of phases in the synchronizing is decided to give substantially the same phases for the direct axis magnetic flux of the direct axis field windings (201), the electromotic force by the DC direct axis magnetic flux and the phase current in FIG. 3(g). The quadrature axis windings (202) compensate the electromotive force (armature reaction) of the AC winding (100) and the commutation magnetic flux (commutation inner electromotive force) is generated for performing the commutating operation.

When the polarity of the torque is inverted, the current phase is converted to substantially inverse phase whereby the polarity of the armature reaction magnetomotive force is inverted. The polarity of excitation of the quadrature axis field windings (202) is converted, so as to conform it. The polarity converting circuit (6) is connected for this purpose. When the converting circuit (6) is a thyristor, the DC current I is cut off to self-extinction of the thyristors (61) to (64) and then, the thyristor for the desired polarity is turned on so as to initiate the current feed.

In the embodiment of the present invention, the commutating times are 10 times. That is, the commutating times are more than that of the case of FIG. 1(b) (six phases) though the phase numbers are less.

The amplitude of the electromagnetic torque pulsation is reduced from 0.6 to 0.36 times. The load of the driven machine and the rotor structure usually consists of an elastic element (torsion of shaft) and an inertia element. At the edge of the driven part, the load is in inverse proportion to the square of the commutating times (torque pulsating frequency). When the superposing angle U is near $\pi/5$ or more than $(\pi/5)$ $(U \geq \pi/5)$, the torque pulsation is remarkably small. The fact can be theoretically shown.

In order to cause the value of the superposing angle U to approach $\pi/5$ and to attain it in stable condition, the feed of the commutating magnetic flux by the quadrature axis field windings (202) imparts the effect. That is, the commutating magnetic flux being proportional to the commutating current I is given, the superposing angle U is stabilized, and the desired superposing angle U can be maintained in the broad operating range. The torque pulsation can be remarkably reduced by using the quadrature axis field windings (202) and providing five to seven phases.

Figure 4:
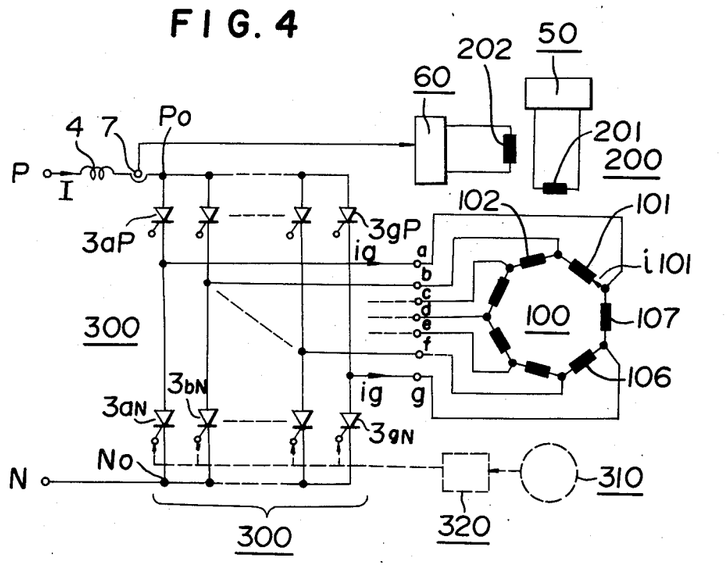
FIG. 4 is a connection diagram of the other embodiment of a motor.
Figure 5:
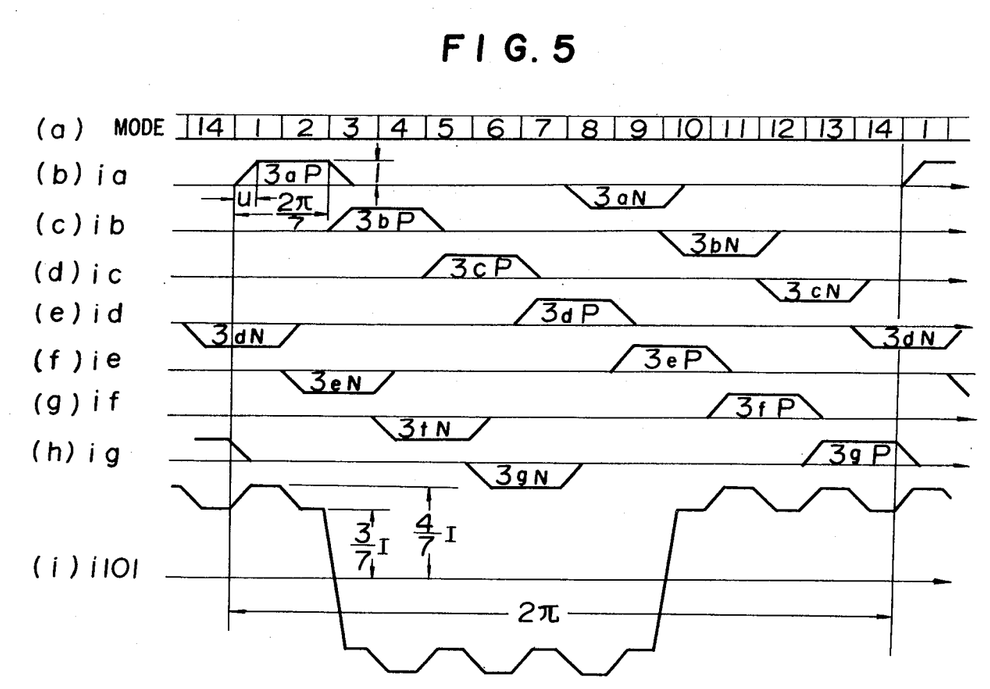
FIG. 5 shows waveforms in the operation of the motor.

FIG. 4 is a connection diagram of another embodiment of the present invention using a seven phase structure of the AC windings (100). The waveforms in operation for the seven phase structure are shown in FIG. 5. The mode is to divide one cycle $2\pi$ into 14 parts and one solid switch is turned on only for the electric angle (($2\pi/7$)+U). The positive solid switches (3aP) to (3gP) are turned on from the initiations of the odd modes. The negative solid switches (3aN) to (3gP) are turned on from the initiations of the even modes.

The line currents ia–ig in the phases are pulse having trapezoid waveforms shown in FIG. 5(b)–(h). The current i101 of the first phase AC windings (101) is shown in FIG. 5(i) wherein i101 is a substantially rectangular waveform having four values of ±3/7I and ±4/7I.

In the case of the seven phase structure, the following advantages are found in comparison with the case of the five phases structure.

In the driving of the motor, it is required to generate torque in a substantially stopped condition. For example, in the condition of stopped rotation with nipping of a load in the driving of a rolling mill, the condition of initiation of nipping or the condition of slight forward or backward rotation for nipping, the above-mentioned requirement is found.

In these conditions, the current is concentrated into only one of the positive solid state switches (3aP) to (3gP) and only one of the negative solid state switches (3aN) to (3gN).

The desired current capacity of one solid state switch is decided depending upon the concentrated conditions in the low speed operation. In order to improve it, a plurality of solid state switches are turned on in parallel in both positive and negative sides. For example, in the embodiment using seven phases, two of the positive windings (3aP) to (3gP) and three of the negative windings (3aN) to (3gN) are simultaneously turned on. The numbers of the positive and negative solid switches for simultaneously turning on can be four or five. The AC windings for two or three phases (2 or 3) are short-circuited whereby they not contribute to generate the torque. The short-circuited windings are not in the space position for providing a high field magnetic flux density to generate the torque.

In the seven AC windings, the AC windings in four or five phases (non-short-circuit) form two parallel circuits to shunt the DC current I. In the short-circuit, two AC windings are connected in series.

The ratio of torque to DC current (torque/current) i.e. torque generating coefficient is proportional to the rated AC voltage between the terminals. The torque generating coefficient $K\rho$ in the above-condition is given by the equation:

$$\frac{K_T(7)}{K_{To}(7)} = \frac{\cos\frac{3\pi}{14}}{\cos\frac{\pi}{14}} = 0.8019 \tag{1}$$

where $K\rho o$ designates the torque at the time of turning on one positive winding and one negative winding. The torque generating coefficient is about 80%. Accordingly, only 1.25 times of the current is required.

In the case of five phases, the non-short-circuit AC windings are two or three and one AC winding is connected in series in the shortest circuit for the DC current. That is, the torque generating coefficient is the same with the case passing only one phase. The torque generating coefficient in the case of five phases can be give by the equation:

$$\frac{K_T(5)}{K_{To}(5)} = \frac{\cos\frac{3\pi}{10}}{\cos\frac{\pi}{10}} = 0.618 \tag{2}$$

The torque generating coefficient is decreased to 62%. 1.62 times of the current should be fed. Accordingly, the effect of simultaneous feeding to plural windings is lost. The five phase structure is inferior to the seven phase structure from the viewpoint of the fact that $K\rho(5)$ for five phases is lower than $K\rho o(7)$ for seven phases.

The seven phase structure is superior to the five phase structure from the viewpoint of the necessary current increasing rate of the power source (not shown), even though the difference of the numbers of the solid state switches is considered. The seven phase structive is superior from the viewpoints of the torque pulsation.

As clearly understood from the description, the seven phase structure is superior to the five phase structure on both of the positive and negative windings in the current controlling mode for simultaneously turning on a plurality of the solid state switches. The plural turn-on control can be applied to even the high speed region.

In the embodiment of seven phases, 14 times of the commutations are performed in one cycle. In the six phase structure of FIG. 1, 6 times of the commutations are performed in one cycle whereas 14 times of the commutations are performed in one cycle in the case of the seven phase structure. The amplitude of the electromagnetic torque pulsation is decreased to 0.43 to 0.18 times in comparison with that of FIG. 1. In the final load end under consideration of the elasticity and inertia of the driven machine and the rotor, the pulsating torque transmitting coefficient is less than 0.18 times (less than the value being inverse-proportional to the square of commutating times). As the result, the torque pulsation at the load end, can be reduced to less than 0.08 to 0.034 times. Thus, in the case of the five phase structure or the seven phase structure, the torque pulsation can be substantially neglected and regarded the same as with a DC motor.

There are many factors for torque vibrations such as a ripple of input current I, a slot ripple, an unbalanced structure (unbalance of spaces) various vibrations and resonance phenomenon of a mechanical load even in a DC motor. In the five phase or seven phase motor of the present invention, the torque pulsation can be reduced to the order of these other factors or less.

In the nine phase structure, the torque pulsation can be further reduced, however, the electric angle of the solid switches (utilization coefficient) is disadvantageously decreased.

In the seven phase structure of FIG. 4, the torque pulsation is remarkably reduced when the superposing angle of the waveforms in the operations is near $\pi/7$ or more (U≠$\pi/7$). In order to attain the superposing angle stably, the feed of the commutating magnetic flux being proportional to the input current by the quadrature axis field winding (202) is effective.

The quadrature axis excitation can be a series winding circuit connection as the same with the five phase structure in FIG. 2.

FIG. 4 shows the structure for indirect series winding excitation instead of the series winding excitation. The indirect series winding excitation can be applied to the five phase structure of FIG. 2.

In the indirect series winding excitation, the current detector (7) and the exciting controller (60) are provided for controlling in corresponding proportion by using the detected output as the command. It is possible to use various DC controlling devices such as a controlling rectifier circuit and a chopper controlling circuit. The indirect series winding excitation can be also applied to the embodiment of FIG. 2.

As described above, the desired superposing angle $U \fallingdotseq \pi/7$ (or $\pi/5$) can be attained stably by combining the quadrature axis field winding (202) with the seven phase (or five phase) structure whereby the torque pulsation can be further reduced.

Figure 6:
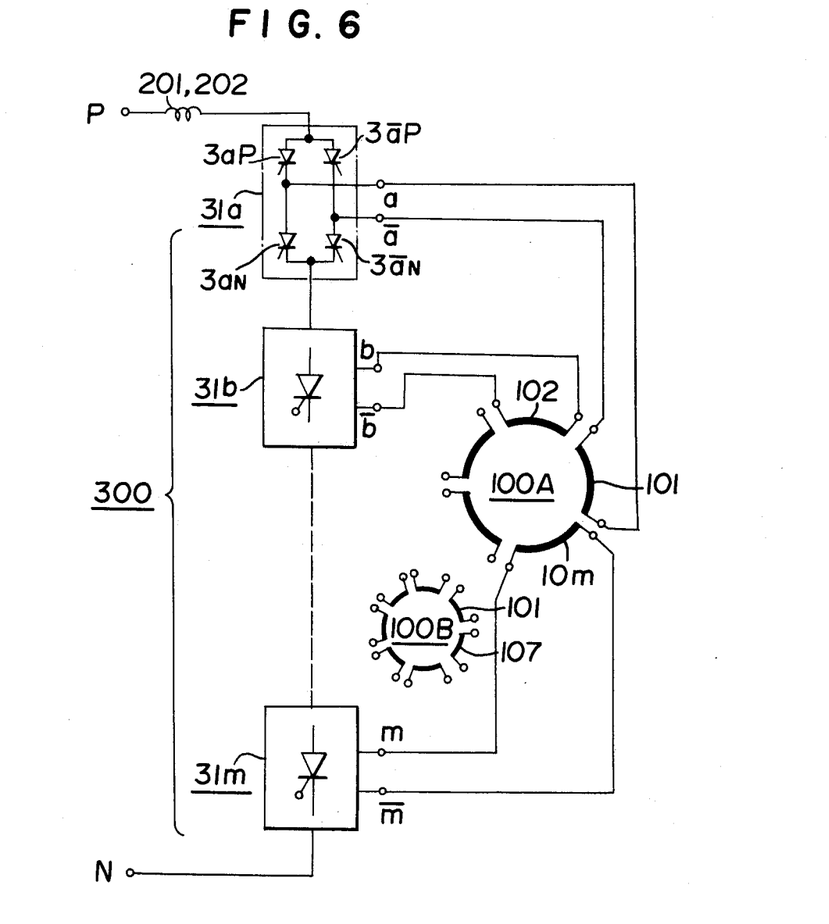
FIG. 6 is a connection diagram of the other embodiment of a motor.

FIG. 6 is a connection diagram of another embodiment of the present invention. In FIG. 6, the AC windings (101) to (10m) are divided in the phases to have terminals a, ā to m, m̄. The phase numbers m are 5 or 7. The reference (100A) shows the five phase structure and (100B) shows the seven phase structure. The solid commutator (300) comprises 5 or 7 groups (phase numbers) of bridge connectors (31a) to (31m) having four solid state switches (3aP), (3aN), (3āP), (3āN) for each bridge connector.

The AC windings (101) to (10m) are respectively connected to the AC terminals a, ā to m, m̄ of the bridges (31a) to (31m). The DC terminals of the bridges are connected in series and connected to the DC input terminals p, N. The quadrature axis field windings (202) or the direct axis series field windings (201) on a filter reactor (4) is connected in series to the DC input circuit. In one bridge, the solid state switches (3aP) and (3āP) are simultaneously turned on or they are controlled to turn-on in the phase difference of δ. The solid state switches (3aN) and (3aP) are simultaneously turned on or they are controlled to turn-on in the phase difference of δ.

In the other bridges, the solid state switches are also controlled to turn-on in the phase difference of $2\pi/5$ or $2\pi/7$ as the same condition.

The case of simultaneous turn-on of the switches, 10 times of the commutations are performed in one cycle in the five phase structure and 14 times of the commutations are performed in one cycle in the seven phase structure.

In the latter turn-on control method with the phase difference of δ, the phase difference is about $\pi/10$ in the five phase structure and $\pi/14$ in the seven phase structure whereby the number of times of the commutations in one cycle are respectively 20 times and 28 times. That is, in the control method with the phase difference of δ for turn-on control between sides of number of the bridges, the times of commutations can be double and the torque pulsation can be further reduced.

In the embodiment of FIG. 6, the electric angle of one solid state switch is about π and the electric angle is remarkably large and the current capacity coefficient of the solid switches is remarkably high in comparison with the embodiments of FIGS. 1, 2 and 4.

In the embodiments of FIGS. 2 and 4, the AC motor is the synchronous motor, and the AC windings (100) are armature windings. Thus, the AC windings (100) can be the primary windings of the cage type induction motor or the secondary windings of the wound-rotor type induction motor. The former will be described below referring to FIG. 7. In the latter case of the wound-rotor type induction motor, multi-phase primary windings are used instead of the field windings (201), (202) to impart AC excitation, and the secondary windings are connected to the solid state commutator (300) in five or seven phases instead of the armature windings and the frequency signal detector is used instead of the position detector (310).

In the wound-rotor type induction motor, it is advantageous to use three phase primary windings on a rotor and to use five or seven-phase secondary windings on a stator. The connections of the primary windings and the secondary windings are opposite to those of the conventional wound-rotor type induction motor. In the structure, the slipping steps can be decreased and the solid commutator can be disposed on the static stator or the ground and the phases can be increased as desired in the present invention.

FIG. 7 is a connection diagram of another embodiment of the cage type induction motor according to the present invention.

In the cage type induction motor, it is difficult to attain the commutation by the inner electromotive force because the exciting current is fed from the primary windings.

Accordingly, in the connections of FIGS. 2, 4 and 6, the solid switches (3aP), (3gN) should be self-turn-off elements such as transistors, gate turn-off elements or thyristors having forcible commutating means.

The embodiment having forcible commutating means is described in FIG. 7 wherein the reference numeral (203) designates a cage type rotor; (101) to (10m) designate windings for a stator; and the five phase structure is shown. It can be the seven phase structure. The reference numerals (3aP) to (3mN) designate thyristors which form thyristor multi-phase bridges (3); (7) designates diode bridges having diodes (7aP) to (7mN) and (81P), (81N), (82P), (82N), (83P), (83N), (84P), (84N) designate commutating thyristors diodes, capacitors and reactors which form the commutation switching device. They can be replaced to self-turn-off type solid switches. The reference numeral (85P), (85N) designate reverse bias auxiliary power source; (86P), (86N) designate auxiliary AC power source for the rectifier of the auxiliary power source; (91) designates a capacitor for voltage-clipping so as to absorb through the diode bridges (7) the switching energy of the accumulated energy by AC winding leakage inductance caused by the commutation. The absorbed energy is treated by the energy absorbing means such as a smoothing reactor (92), a recovering converter (93) and a recovering AC power source (94).

In the embodiment of FIG. 7, when one of the positive main thyristors (3aP) to (3mP) is turned off, the commutating switches (81P) to (84P) are turned on in pulses and the voltage of the reverse bias auxiliary power source (85P) is applied to cause the full reverse bias of the positive main thyristors (3aP) to (3mP) to be applied through the diodes (7aP) to (7mP). After the pulse reverse bias, the commutating switches (81P) to (84P) are in the OFF state and one of the thyristors (3aP) to (3mP) is turned on. The turn-off of the negative thyristors (3aN) to (3mN) is also attained by the commutating switches (81N) to (84N) and the reverse bias auxiliary power source (85N) in pulses.

After the turn-off, the AC winding current is commutated under controlling the voltage of the leakage inductance $1di/dt$ by the diode bridge (7) and the capacitor (91). In this case, the commutation superposing angle U is reduced depending upon the increase of the control voltage by the capacitor (91) and it is increased depending upon the decrease of the control voltage. Accordingly, when the voltage of the capacitor (91) is controlled by the recovering inverter (93), the superposing angle U can be controlled to give the desired superposing angle $$U \geq \pi/5 \text{ to } \pi/7.$$

As described above, the present invention is also effective for reducing the torque pulsation of the cage type induction motor.

The winding method for forming the AC windings (100) having five or seven phases used in the present invention will be described.

Figures 8A, 8B:
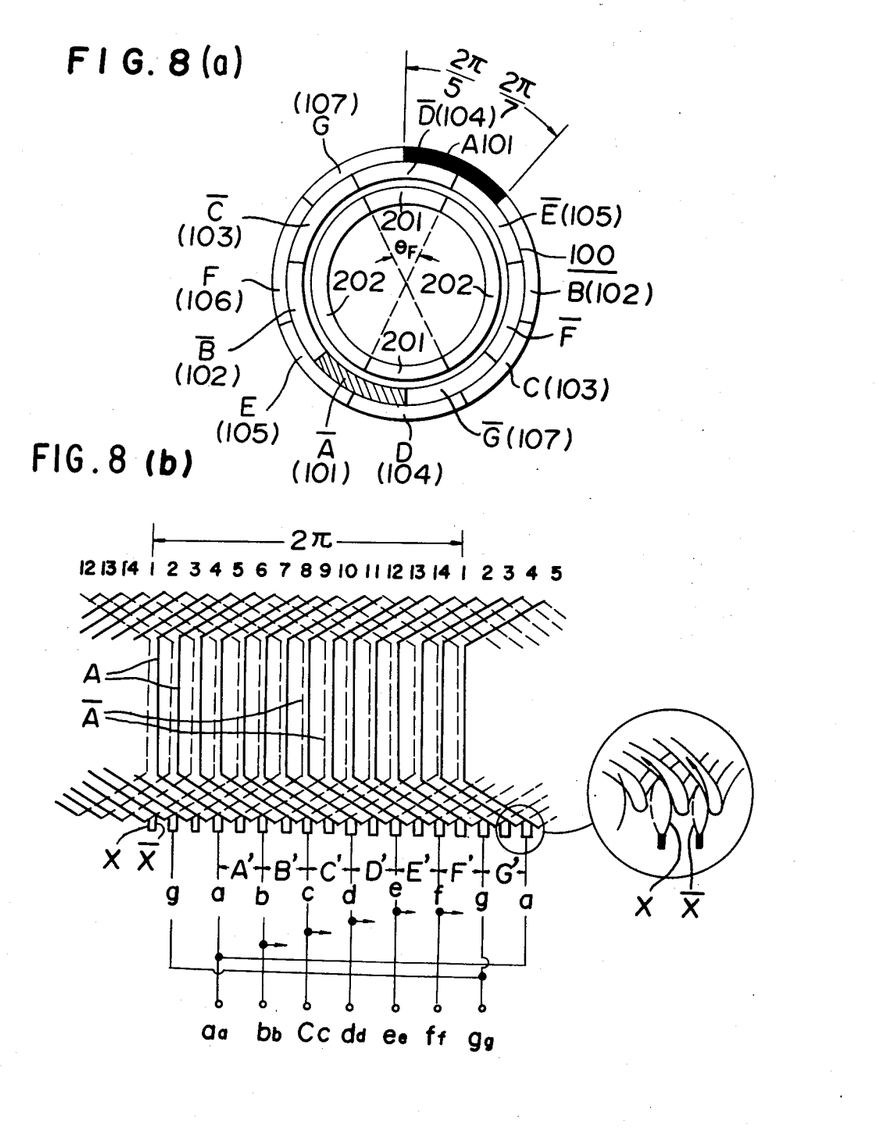

FIG. 8(a) is a sectional view of the conductor distribution for showing the distributing belt for the electric angle of $2\pi$ that is two poles.

FIG. 8(b) is a view of expanded windings.

In FIG. 8(a), the first phase windings (101) form coil or coils as the coil sides of the conductors buried in the first layer conductor distributing belt (A) (Black) and the second layer conductor distributing belt $\bar{A}$ (slant lines) which is shifted by the electric angle $\pi$.

The distributing belt of the conductors for one phase corresponds to the elecrtric angle of $2\pi/5$ or $2\pi/7$. In the second to fifth phases or the second to seventh phases, the coil sides are distributed in the first layer conductor distributing belt B to E or G and the second layer conductor distributing belt $\bar{B}$ to $\bar{E}$ or $\bar{G}$. The coil pitch of each winding is substantially $\pi$ and more than $\pi/5$, whereby the formation of the space higher harmonic magnetic flux (the second, fourth or sixth space higher harmonic magnetic flux).

In the conventional three phase (or six phase) windings shown in FIG. 1(c), (d), the space higher harmonics are eliminated by two times of phases i.e. even phases six phases of the windings in the inner winding structure. On the other hand, in the embodiment of FIG. 8 according to the present invention, the space higher harmonics are prevented by providing the coil pitch for one phase to be the electric angle of about $\pi$. The phases need not be two times in the inner winding structure, and the structure can be simple.

The expansion of the AC windings is shown in FIG. 8(b). The full line coil sides show the first layer conductors and the dotted line coil sides show the second layer conductors and the first and second conductors are respectively buried in the upper layer and the lower layer.

When the coil lead (X) from the full line sides is an inlet, the coil lead ($\bar{X}$) from the dotted line sides is an outlet. The enlarged view is shown in circle at the right side. The coil leads (X), ($\bar{X}$) of the adjacent coils are connected and the leads a to e or f shifted by the electric angle of $2\pi/5$ (five phase structure) or $2\pi/7$ (seven phase structure) are respectively connected to outer terminals aa to ee or ff. The coils for the electric angle of $2\pi$ (each phase: each pole) are connected in parallel or in series for pole number pairs.

The wave winding method can be also applied instead of the winding method of FIG. 8(b). In the wave winding method, the outlets of a pair of coils are connected to the inlet of the coil shifted by the electric angle of $2\pi$, and sequentially connected in series to the coils for the other pairs and the one phase coil is formed by winding for the slots for each pole and each phase around all peripheral parts. The five or seven phase AC windings in the loop connection can be formed by the above-mentioned methods.

The corresponding separating windings for each phase in FIG. 4 can be independently lead out without the transition connections of the coil leads between phases.

As described above, when the phase belt (conductor distributing zone width) is $2\pi/5$ or $2\pi/7$, the slots for each phase and each pole are increased to decrease the slot ripple.

When the coil pitch is more than $\pi/5$, the space higher harmonics can be decreased. The phases on the inner winding structure can be equal to the phases on the outer circuit, whereby the windings can be easily carried out.

In FIG. 8(a), the rotor windings (201), (202) are respectively the direct axis field windings and the quadrature axis field windings. The distributing regions of the coil conductors are shown. In the five or seven phases, the distributing with $\theta_F$ of the direct axis field windings (201) is substantially equal to narrower than that of the windings (202). The effective torque generating region is wide, whereby the miniaturization of the motor can be easily attained. The rotor can be the cage type rotor.

As described above, in accordance with the present invention, the phases of the AC windings are five or seven phases whereby the torque pulsation can be reduced. The AC windings are disposed on the stator, the slip rings can be minimized and the solid commutator can be easily disposed in the stator side. The phases are connected in loop connection whereby the time for feeding current to each winding can be long to increase the utilization of the windings and the connections of the coil ends can be simplified. When the bridge connection solid commutator unit is used, the utilization of the solid state switches is increased.

These effects of the present invention can be also attained in the combination of the synchronous motor, the cage type induction motor or the wound-rotor type induction motor. In the combination of the synchronous motor, the superposing electric angle is stabilized to improve the effect for reducing the torque pulsation by a plurality of excitating means (excitation) having different magnetic axes and the space higher harmonics can be prevented by providing a coil pitch of more than $\pi/5$.

What is claimed is:

1. In an AC rotary machine apparatus comprising an AC rotary machine having AC windings and an AC feeder having solid state switches which feeds AC power to the AC windings, an improvement which comprises the AC windings forming seven phases.

2. An AC rotary machine apparatus according to claim 1 which comprises the AC windings forming seven phases and having coil pitches more than the electric angle $\pi/5$.

3. An AC rotary apparatus according to claim 2, wherein the AC rotary machine is a synchronous machine and position detecting means for detecting electromagnetic relative position between the armature and the field of the synchronous machine is connected whereby the solid switches of the AC feeder are controlled to turn on and off depending upon the outputs of the detecting means.

4. An AC rotary apparatus according to claim 2 wherein the AC rotary machine is an induction machine and the AC windings are disposed on a stator thereof.

5. An AC rotary machine apparatus to claim 1 wherein the AC feeder has m groups of single phase feeding units, and each of the single phase feeding units feeds to each phase of the AC windings.

6. An AC rotary machine apparatus according to claim 5 wherein each of the single phase feeding units consists of a single phase inverter in bridge connection, and the AC output terminals of each of the inverters are connected to each phase of the AC windings, and the DC output terminals of each of the inverters are mutually connected in series.

7. An AC rotary machine apparatus according to claim 5 wherein the AC rotary machine is an induction motor or a synchronous motor.

8. A synchronous machine apparatus comprising a synchronous machine having AC windings and an AC feeder having solid state switches which feeds AC power to the AC windings, an improvement which comprises the AC windings forming seven phases.

9. A synchronous machine apparatus according to claim 8 which further comprises position detecting means for detecting electromagnetic relative position between the armature and the field of the synchronous machine whereby the solid state switches of the AC feeder are controlled to turn on and off depending upon the outputs of the detecting means.

10. A synchronous machine apparatus according to claim 8 wherein the AC windings are disposed on a stator.

11. A synchronous machine apparatus according to claim 8 wherein the synchronous machine has a plurality of exciting means having different magnetic axes.

12. A synchronous machine apparatus according to claim 8 wherein the phases of the AC windings are connected in a loop connection.

13. In a cage type induction machine apparatus comprising a cage type induction machine having AC windings and an AC feeder having solid state switches which feeds AC power to the AC windings, an improvement which comprises the AC windings forming seven phases.

14. A cage type induction machine apparatus according to claim 13 wherein the phases of the AC windings are connected in a loop connection.

15. A cage type induction machine apparatus according to claim 13 wherein a space distributing phase belt of a coil for one phase of the AC windings per one pole is $2\pi/m$ wherein m designates phase numbers.

16. In a wound type induction machine apparatus comprising a wound-rotor type induction machine having primary windings and secondary windings and an AC feeder having solid state switches which feed AC power to the primary windings or the secondary windings of the induction machine, an improvement which comprises the AC windings forming seven phases.

17. A wound type induction machine apparatus according to claim 16 wherein the AC feeder is a frequency converter and the windings fed from the frequency converter are the secondary windings.

18. A wound type induction machine apparatus according to claim 17 the secondary windings are disposed on a stator.

19. A wound type induction machine apparatus according to claim 16 wherein the windings fed from the AC feeder are disposed on a stator of the induction machine.

20. A wound type induction machine apparatus according to claim 19 wherein the primary windings on a rotor are formed in three phases.

* * * * *